Patented July 9, 1940

2,207,570

UNITED STATES PATENT OFFICE 2,207,570

ASYNCHRONOUS ELECTRIC POWER TRANSMISSION SYSTEM

Ernst F. W. Alexanderson, Schenectady, N. Y., assignor to General Electric Company, a corporation of New York Application December 14, 1937, Serial No. 179,697

28 Claims. (Cl. 172—237)

My invention relates to electric power transmission systems and more particularly to alternating current asynchronous electric power transmission systems.

One of the important uses of circuits employing electronic discharge devices is expected to be found in the improvement of electric power transmission by overcoming the limitations of synchronous operation. When the problem is to exchange power between large systems which are not in synchronism, and when the transmission line used in such a transfer is extremely long from an electrical standpoint, it may be desirable to permit the transmission of electric power asynchronously.

As is well known by those skilled in the art, in the transmission of power synchronously between two points in an electric power transmission system, the power transmitted varies directly as the product of the voltage at the transmitting point, the voltage at the receiving point and the sine of the angle between the voltage vectors at the transmitting and the receiving points, and varies inversely as the inductive reactance between the two points. Of course, as load is applied to such a system, the angle between the voltages at the two points increases and the theoretical maximum power limit occurs at that value of load at which the angular displacement between the voltages at the transmitting and reseiving points is substantially 90 electrical degrees. In the case of the transmission of power over a transmission line, these fundamental considerations apply where the points of reference are the transmitting end and the receiving end of the line. Where the transmission of power between rotating apparatus is involved, such as the transmission of power between a synchronous generator and a synchronous motor over a transmission line, the voltage references of course are the axes of the induced voltages of the motor and the generator, respectively. Therefore, in synchronous electric power transmission, in order to maintain the system in stable operation it is necessary that the system be operated well within the maximum power limit so that the angular displacement between the transmitting end voltage and the receiving end voltage is always less than 90 electrical degrees.

Electrically long transmission lines constitute a special problem in alternating current transmission because of the distributed inductance of the lines which tends to make synchronous operation difficult. In Patent No. 1,921,718 granted August 8, 1933 on my application and assigned to the assignee of the present application, there is described a system of electric power transmission which is termed "wave transmission." In such systems if the equivalent resistance load is equal to the surge impedance of the transmission line, the voltage will be constant throughout the length of the transmission line and the maximum power transfer takes place at a given voltage. For practical reasons, it is sometimes desirable to place the electronic converter at the beginning or the transmitting end of the transmission line rather than at the end of the line, thereby permitting the use of a single electronic converter instead of a number of converters where there are several distribution centers. When an electronic converter is connected to the receiving end of the transmission line it functions as a positive resistance relative to the transmission line, maintaining the voltage of the transmission line within a predetermined range of values. However, when an electronic converter is connected to the transmitting end of the line, the electronic converter acts as a negative resistance relative to the transmission line and if additional apparatus or additional control is not provided, the voltage of the transmission line tends to exceed a safe operating value during no load or light load operating conditions. Therefore, I propose an asynchronous alternating current transmission system in which an electronic converter is placed at the transmitting end of a transmission line to permit asynchronous transmission of power between a source and a load circuit and whereby the voltage of the system is maintained within a predetermined safe range of operating values. In the electric power transmission system which I propose, electric power may be transmitted asynchronously between a sending point and a receiving point in a transmission system without regard to the angular displacement between the sending end voltage and the receiving end voltage. By virtue of this feature, electric power may be transmitted to any desired distance and the practical limit of transmission will depend only upon copper losses.

It is an object of my invention to provide a new and improved electric power transmission system.

It is another object of my invention to provide a new and improved electric valve circuit.

It is a further object of my invention to provide a new and improved asynchronous electric power transmission system.

It is a still further object of my invention to provide a new and improved voltage controlling or regulating arrangement for electric power transmission systems.

In accordance with the illustrated embodiments of my invention, I provide an alternating current asynchronous electric power transmission system for transmitting power between alternating current systems or circuits. An electric valve circuit or electronic converter is connected between a source of alternating current and the transmitting end of a transmission line to permit the transmission of electric power asynchronously between the source and a load circuit which is connected to the receiving end of the transmission line. The electronic converter comprises a plurality of electric valve means having control members for controlling the conductivities thereof and the control members are energized to render the electric valve means conductive in a predetermined order.

In one embodiment of my invention, I provide a suitable means, such as an electric valve rectifier of the controlled type, connected to the transmitting end of the transmission line to limit or control the voltage of the transmission line. The rectifier is of the type having a plurality of electric valve means of the controlled type to control the amount of lagging reactive volt-amperes absorbed from the transmission line. The conductivities of the electric valve means in the rectifier are controlled by a voltage-responsive or voltage-sensitive circuit to maintain the voltage at the transmitting end of the line within a predetermined range of values.

In another embodiment of my invention, I provide an electric power transmission system in which an alternating current generator of the synchronous type is connected to the transmitting end of a transmission line through an electric valve converter to permit the transmission of power asynchronously between the generator and a load circuit connected to a receiving end of the transmission line. The conductivities of the electric valve means in the electric valve converter are controlled to maintain the voltage at the transmitting end of the line within a predetermined range of values. Furthermore, the excitation of the alternating current generator is controlled in accordance with the frequency of the voltage at the transmitting end of the line to control the voltage of the line. One way in which the control of the electric valve means may be accomplished is by the use of a controlled rectifier connected to the transmitting end of the line and which is responsive to the voltage of the line. The rectifier may be of the controlled type and may be designed as a control element to provide a controlling influence, rather than as a power element, to absorb the lagging reactive volt-amperes to maintain the voltage at the transmitting end of the line within a safe operating range. The controlled rectifier shifts the phase of the alternating voltages impressed on the control members of the electric valve means in the converter circuit to cause the converter to absorb variable amounts of lagging reactive volt-amperes to control the voltage at the transmitting end of the line.

In accordance with a still further embodiment of my invention, I provide an asynchronous electric power transmission system of the type in which an induction generator transmits power to a load circuit over a transmission line, and in which static capacitances are connected to the terminals of the induction generator to supply excitation current thereto. A controlled rectifier is connected to the terminals of the induction generator or to the transmitting end of the line to limit the voltage of the line during no load or light load operating conditions of the system.

For a better understanding of my invention, reference may be had to the following description taken in connection with the accompanying drawings and its scope will be pointed out in the appended claims.

Figure 1A:
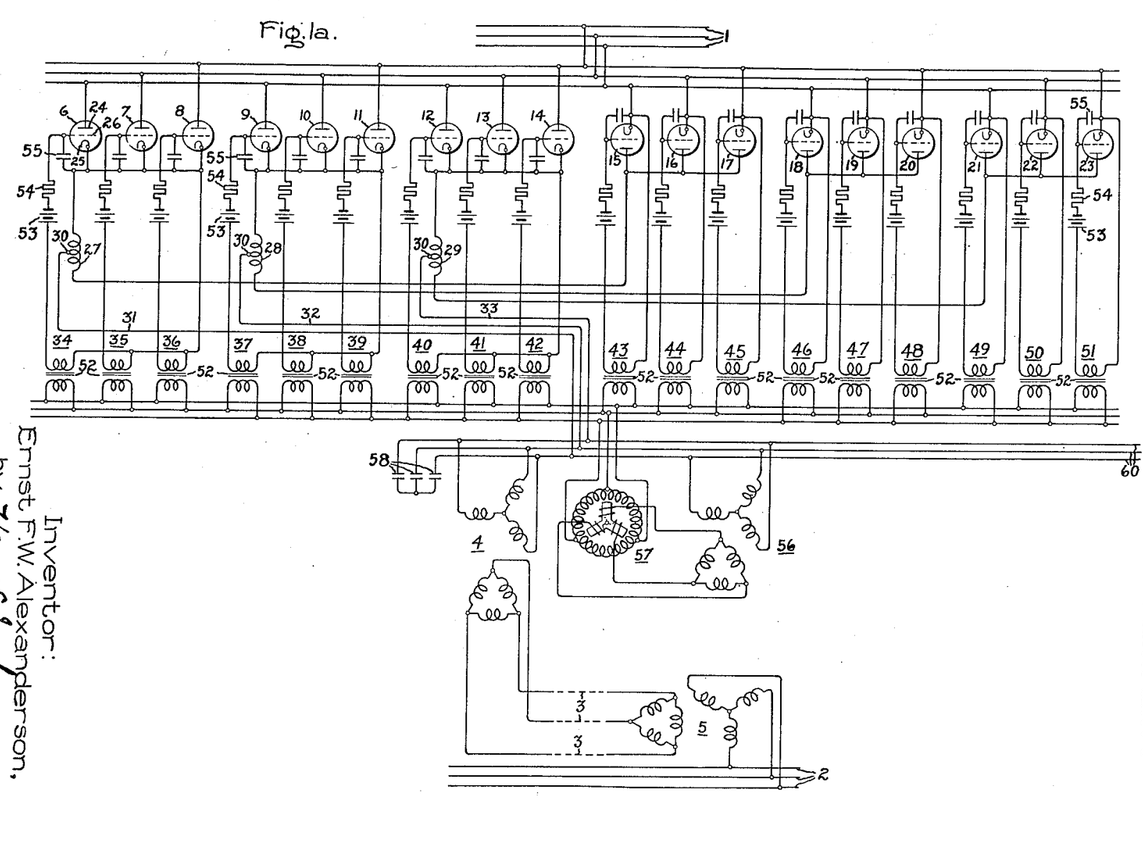
Figs. 1a and 1b diagrammatically illustrate an embodiment of my invention as applied to an electric power transmission system for transmitting power between a supply circuit and a load circuit over an alternating current transmission line.
Figure 1B:
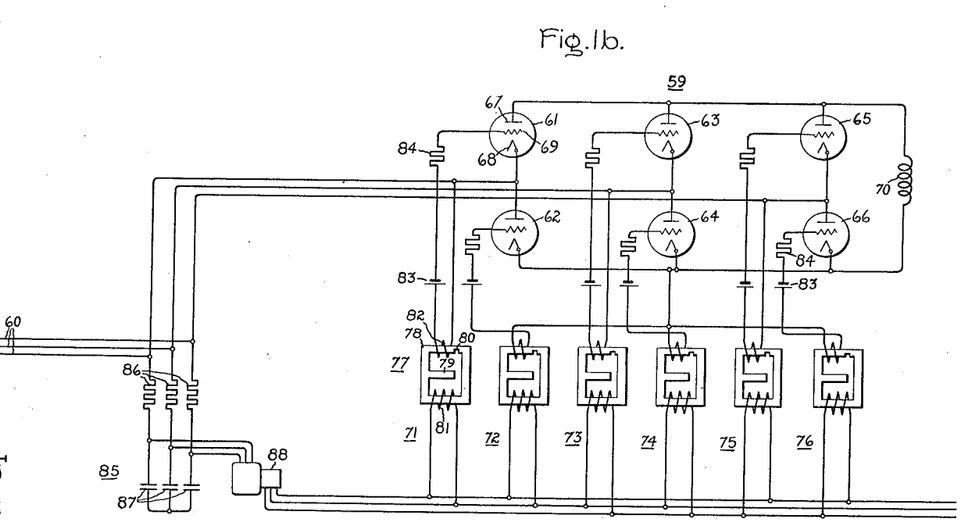

Considering Figs. 1a and 1b conjointly, there is diagrammatically illustrated an embodiment of my invention as applied to an asynchronous alternating current electric power transmission system for transmitting power asynchronously between an alternating current circuit 1 and an alternating current circuit 2 over an alternating current transmission line 3 of a sufficient length to have an appreciable capacitive reactance. Alternating current circuit 1 may be an alternating current circuit of constant frequency or a circuit the frequency of which varies within an appreciable range. Transformers 4 and 5 may be connected to the transmitting end and the receiving end, respectively, of the transmission line to effect the desired voltage transformations. Connected between the alternating current circuit 1 and the transmitting end of the transmission line, I provide an electric valve circuit or electronic converter which permits the transfer of electric power asynchronously between circuit 1 and circuit 2. The electronic converter includes electric valve means 6—23 which are preferably of the type employing an ionizable medium, such as a gas or a vapor, and each includes an anode 24. a cathode 25 and a control member 26 which controls the conductivities thereof. Smoothing reactors 27, 28 and 29 are connected between the electric valves 6—23 and the transmitting end of the line. Each of the smoothing reactors 27—29 is provided with an electrically intermediate connection 30 which is connected to the transformer 4 through conductors 31, 32 and 33, respectively. The electronic converter is of the type which permits the asynchronous transmission of power between circuits 1 and 2 when the frequency of circuit 1 is equal to or greater than the frequency of circuit 2. Power is transmitted from circuit 1 to circuit 2 asynchronously when the frequencies of these circuits are equal, and power may be transmitted asynchronously when there is a substantial difference between the frequencies of the circuits, as for example, under the conditions when the frequency of circuit 1 is three or four times that of circuit 2.

To control the conductivities of the electric valves 6—23 to permit asynchronous transfer of power between circuits 1 and 2, I provide an excitation system including a plurality of individual excitation circuits 34—51 and which are associated with the electric valves 6—23, respectively. To permit the asynchronous transmission of power between circuits 1 and 2, the excitation circuits 34—51 may be energized in accordance with the output voltage of the electronic converter. In this manner, the control voltages impressed on control members 26 of electric valves 6—23 vary in phase in accordance with the output voltage of the electronic converter. The excitation circuits 34—51 impress periodic or alternating voltages on the control members 26 to render the electric valves conductive in a predetermined order. Each of the excitation circuits 34—51 includes a transformer 52, a suitable source of negative unidirectional biasing potential such as a battery 53, a current limiting resistance 54 which is connected in series relation with the associated control member 26, and a capacitance 55 which is connected across the cathode 25 and the control member 26 to absorb extraneous transient voltages. The excitation circuits 34—51 may be energized from the transmitting end of the system through an insulating transformer 56. Any suitable phase shifting arrangement, such as a rotary phase shifter 57, may be employed to adjust the phase of the voltages impressed on the control members 26 relative to the applied anode-cathode voltages.

Where it is desired to better the wave form of the current transmitted by the electric valve converter, capacitances 58 may be connected to the transmitting end of the system. The capacitances 58 also function to stabilize the operation of the system.

As a means for limiting or controlling the magnitude of the voltage at the transmitting end of the system during no load or light load operating conditions, I provide a controlled rectifier 59 which is connected to the transmitting end of the line through conductors 60. The rectifier 59 includes electric valves 61—66 which are preferably of the type employing an ionizable medium, such as a gas or a vapor, and each includes an anode 67, a cathode 68 and a control member 69. The control members 69 are energized so that the rectifier 59 absorbs variable amounts of lagging reactive volt-amperes from the transmission system to control the voltage of the system. The output circuit of the rectifier 59 is effectively short circuited through an inductive reactance 70.

I provide a plurality of excitation or control circuits 71—76 which are associated with electric valves 61—66, respectively, and impress on control members 69 thereof alternating voltages to render the electric valves conductive in a predetermined order. Each of the excitation circuits 71—76 may include a saturable inductive device such as a transformer 77 of the type designed to produce an alternating voltage of peaked wave form and which includes a core member 78 having a shunt path 79, a restricted saturable portion 80, a primary winding 81 and a secondary winding 82 in which there is induced an alternating voltage of peaked wave form. A suitable source of negative unidirectional biasing potential, such as a battery 83 and a current limiting resistance 84, are connected in series relation with the associated control member 69.

As an agency for controlling the phase of the alternating voltages impressed on control members 69 in accordance with the voltage at the transmitting end of the system, I provide a circuit 85 comprising resistances 86 and capacitances 87. The capacitances 87, in conjunction with the inductance of primary winding 81 of transformers 77, constitute a tuned circuit which is responsive to the voltage at the transmitting end of the system, or, in other words, responsive to the voltage appearing across conductors 60. If desired, a phase shifting means such as a rotary phase shifter 88 may be connected between the capacitances 87 and primary windings 81 of transformers 77 to permit adjustment of the voltages impressed thereon.

Figure 2:
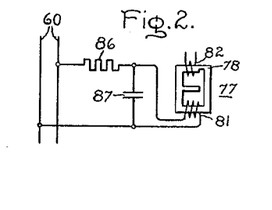
Fig. 2 is a simplified embodiment of a voltage responsive circuit shown in Figs. 1b

Fig. 2 is a simplified diagrammatic representation of the voltage responsive circuit 85 as shown in connection with a single phase arrangement. It is to be understood that where an inductive phase shifting means is connected between the capacitances 87 and the transformers 77, the inductance of that device must be considered in connection with the inductance of the primary windings 81 in the design of the voltage sensitive circuit.

The operation of the embodiment of my invention shown in Figs. 1a and 1b will be described by considering the system when power is being transmitted asynchronously from the alternating current circuit 1 to the alternating current circuit 2 over the transmission line 3. The electronic converter including electric valve means 6—23 operates essentially as a frequency changer relative to the circuit 1 and the transmission line 3 to permit the transmission of electric power asynchronously between these circuits. It is to be understood that the electric power may be transmitted over the transmission line 3 at a frequency substantially equal to the frequency of the circuit 1, or at a frequency less than the frequency of circuit 1, and that the electric valves 6—23 permit the voltage of circuit 1 and the receiving end voltage of the system to swing relative to each other without interfering with the transmission of power, thereby obviating the limitations of synchronous-to-synchronous transmission. The manner in which the electronic converter including electric valves 6—23 transmits alternating current between the circuit 1 and the transmitting end of the transmission line 3 is well understood by those skilled in the art. For example, electric valves 6—14 are oppositely disposed relative to electric valves 15—23. The electric valves 6—23 operate as a rectifier relative to the alternating current circuit 1 and as an inverter relative to the transmission line 3. Groups of the electric valves, for example, groups 6—8, 9—11 and 12—14, transmit unidirectional current and each group acts as a polyphase rectifier relative to the voltage of circuit 1. Of course, the electric valve of each of the individual groups which conducts current at a particular time is that one which is subjected to the most positive anode voltage. On the other hand, electric valves 15—23, which are also arranged in groups of three relative to circuit 1, also act as polyphase rectifiers to return the unidirectional current to circuit 1, and the electric valve to conduct in each group at a particular time is determined by the voltages of the alternating current circuit 1. Due to the fact that the excitation circuits 34—51 are connected to the output circuit of the electronic converter including electric valves 6—23, the electronic converter acts as an asynchronous or elastic link between circuit 1 and circuit 2. It is well known that the voltage of a long alternating current transmission line has the tendency to rise to an excessively high value if one end is connected to a constant voltage power system and if the other end is free to oscillate. Since the electric valves 6—23 operate as an inverter relative to the transmission line 3, the equivalent circuit for the electronic converter may be represented as an equivalent negative resistance, which characteristic permits the sending end voltage to rise under light or no-load conditions. The controlled rectifier 59, however, is excited to absorb variable amounts of lagging reactive volt-amperes to maintain the voltage at the transmitting end of the line within a safe operating range.

Rotary phase shifter 88 is initially adjusted so that the voltages impressed on control members 69 lag the respective anode-cathode voltages by substantially 90 electrical degrees for the particular value of sending end voltage which it is desired to maintain. It is to be noted that a rectifier of the controlled type absorbs lagging quadrature current when the grid excitation is retarded and when the output circuit of the rectifier is connected to an inductive load. The current absorbed by the rectifier when the control voltages are retarded 90 electrical degrees is entirely a quadrature lagging current. By the absorption of the variable amounts of lagging quadrature current voltage at the transmitting end, the system is maintained within a predetermined range of values or at a substantially constant value.

Figure 3:
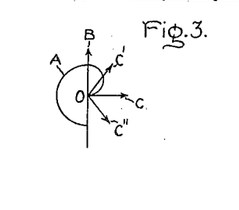
Fig. 3 represents certain operating characteristics thereof.

The voltage sensitive circuit 85 controls the phase of the voltages impressed on control members 69 relative to the associated anode-cathode voltages to cause the rectifier 59 to absorb increased amounts of lagging quadrature current when the voltage at the transmitting end of the system tends to exceed the predetermined value or the predetermined range of values. The manner in which the voltage sensitive circuit 85 operates may be explained by referring to the operating characteristics shown in Fig. 3 where the curve A is a polar diagram of the average conductivity, of an electric valve employing an ionizable medium, as a function of phase displacement between the voltages impressed on the control members and the applied anode-cathode voltages. Vector OB represents the anode-cathode voltage for one of the electric valves. The rotary phase shifter 88 is adjusted so that vector OC, which represents the voltage impressed on the control members 69 of one of the electric valves, has the position shown in the diagram and which is the 90° lagging position. Circuit 85 responds to advance the phase of the control member voltage OC to the position OC' when the voltage at the transmitting end of the system tends to exceed the predetermined value to be maintained, thereby causing the rectifier 59 to absorb a larger amount of lagging quadrature current. The absorption of this increased amount of lagging quadrature current tends to restore the voltage to the predetermined value. Conversely, when the voltage at the transmitting end of the system decreases to a value below the range to be maintained, the voltage sensitive circuit 85 retards the voltage impressed on the control member 69 to a position corresponding to the vector OC'', causing the rectifier 59 to absorb a smaller amount of lagging quadrature current. Of course, the voltage will tend to rise due to the decrease in the amount of lagging quadrature current absorbed.

An important feature of my invention is the manner in which power is transmitted asynchronously between the alternating current supply circuit 1 and the alternating current load circuit 2 over the transmission line 3. By virtue of the operation of the electric valve circuit including electric valves 6—23, power is transmitted between circuits 1 and 2 irrespective of the angular displacement between the vectors representing the voltages of circuits 1 and 2. Although transmission line 3 is an electrically long transmission line, the system effects stable transmission of power between circuits 1 and 2 even though the angular displacement between the voltage vectors of circuits 1 and 2 exceeds the 90 electrical degree limit inherently present in synchronous-to-synchronous transmission. Furthermore, the system transmits electric power even though the angular displacement between the voltages of circuit 2 and the output circuit of the electric valve circuit exceeds 90 electrical degrees.

Considering more particularly the manner in which the voltage sensitive circuit 85 operates, reference may be had to Fig. 2. The capacitance 87 in conjunction with the inductance of primary winding 81 constitutes a tuned circuit which is arranged to be in parallel resonance when the voltage at the transmitting end of the system is at a predetermined value. The current flowing through the resistance 86 at this value of voltage is, of course, zero and the voltage impressed on the capacitance 87 and primary winding 81 is substantially in phase with the voltage at the transmitting end or the voltage of conductors 60. Of course, the voltage impressed on the primary winding 81 may be shifted to the position of vector OC to obtain the desired initial or reference phase displacement. When the voltage of conductors 60 tends to rise above the predetermined value, the winding 81 absorbs a larger amount of current due to the saturable nature of the associated core 78, causing the current which flows through resistance 86 to be predominately inductive and therey effecting an advancement in phase of the voltages impressed on primary winding 81 and hence an advancement in phase of the alternating voltage of peaked wave form induced in secondary winding 82. Conversely, when the voltage of conductors 60 tends to decrease below the predetermined value, the current flowing through resistance 86 is predominately capacitive, effecting a retardation in the phase of the voltage applied to primary winding 81 and causing a retardation in the phase of the alternating voltage of peaked wave form induced in secondary winding 82. In this manner, the phase of the alternating voltage of peaked wave form impressed on control members 69 of electric valves 61—66 is varied in accordance with the voltage at the transmitting end of the system.

Figure 4A:
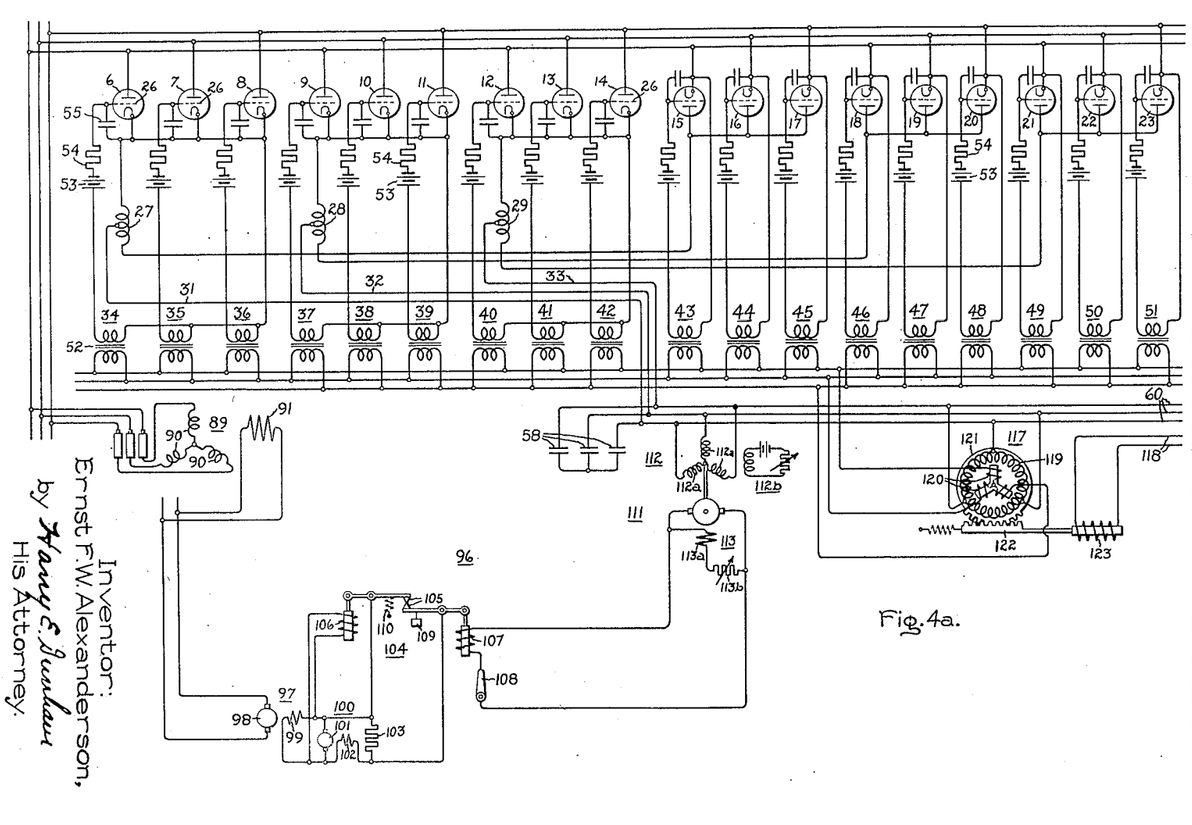
Figs. 4a and 4b diagrammatically illustrate another embodiment of my invention as applied to an electric power transmission system in which an alternating current generator of the synchronous type is connected to a transmission line through an electronic converter to permit the transmission of electric power asynchronously between the generator and a load circuit.
Figure 4B:
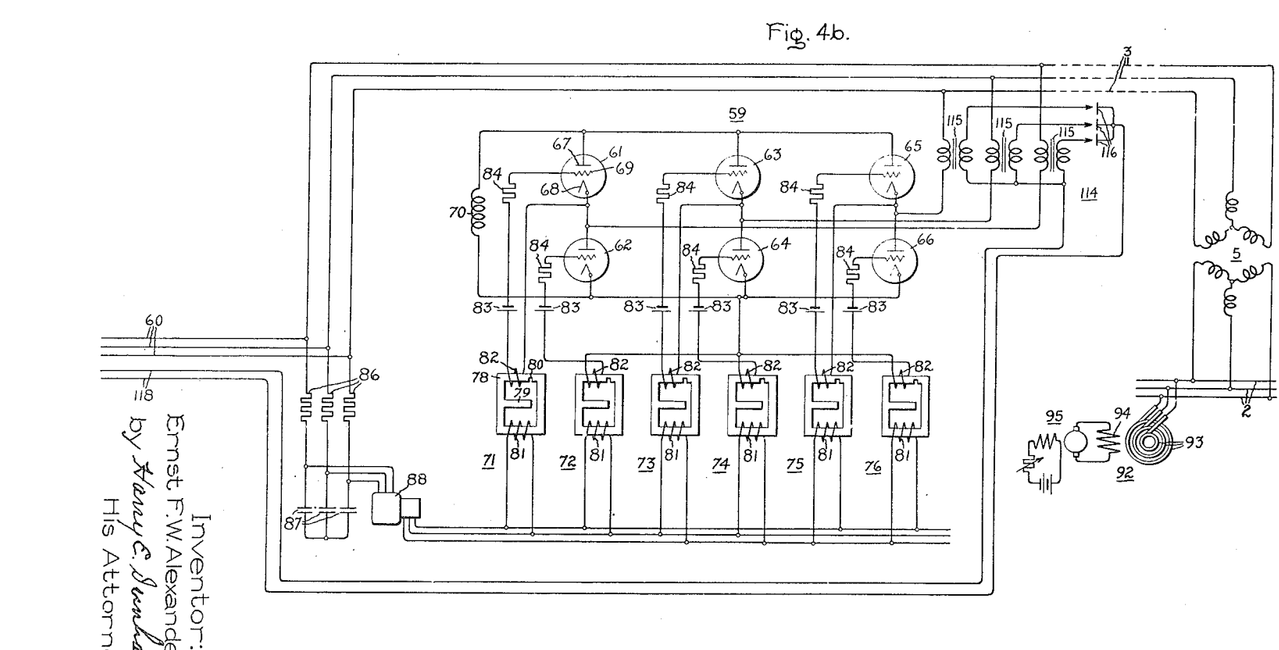

In Figs. 4a and 4b of the drawings, considered together, there is diagrammatically illustrated another embodiment of my invention as applied to an alternating current electric power transmission system for transmitting power asynchronously between an alternating current generator and a load circuit over a transmission line. The arrangement shown in Figs. 4a and 4b is similar in many respects to that shown in Figs. 1a and 1b and corresponding elements have been assigned like reference numerals. In the arrangements shown in Figs. 4a and 4b, the rectifier 59 is preferably employed as an element to control the electric valve circuit or other associated apparatus and does not absorb an appreciable lagging quadrature current to control the voltage of the transmission line at the transmitting end, but serves to control other associated apparatus which in turn controls the voltage of the system.

I provide an alternating current generator 89 which is of the synchronous type having armature windings 90 and an excitation or field winding 91. Armature windings 90 are connected to the transmitting end of the transmission line 3 through electric valves 6—23 and conductors 31—33 and 60 and permit asynchronous transmission of electric power between generator 89 and the load circuit 2. The apparatus connected to the load circuit 2 may include a dynamo-electric machine 92 of the synchronous type having an armature circuit 93 and an excitation or field circuit 94 which is energized by an exciter 95.

To control the power produced by generator 89, I provide a controlling or regulating circuit 96 which may be of any conventional arrangement known in the art. The circuit 96 controls the energization of excitation circuit 91 of generator 89 and may comprise an exciter 97 having an armature 98 and a field winding 99, a sub-exciter 100 having an armature 101 and a field winding 102, a field regulating resistance 103 for the field winding 102 of the sub-exciter 100, and a suitable voltage controlling means, such as a regulator 104. By way of example, I have shown the regulator 104 as being of the vibratory type which includes a pair of cooperating contacts 105 which intermittently shunt resistance 103, a coil 106 which is responsive to the voltage of the sub-exciter 100 and a coil 107 which is responsive to a current or voltage which varies in accordance with the frequency of the voltage at the transmitting end of the system. A switch 108 is connected in circuit with coil 107 to disconnect the regulator 104 from the controlling circuit. The lower contact 105 of the regulator 104 is balanced by a weight 109, and the upper contact 105 is biased downwardly by a suitable means, such as a spring 110, which may be connected to the supporting arm for the lower contact 105.

To control the power transmitted by the generator 89 to the load circuit 2, I provide a circuit 111 which variably energizes coil 107 of the voltage regulator 104. The circuit 111 is connected to circuit 60 and produces an electrical quantity, such as a voltage or current, which varies in accordance with the frequency of circuit 60. Circuit 111 may comprise a dynamo-electric machine 112 of the synchronous type having armature windings 112a and an excitation circuit 112b, and a mechanically coupled direct current generator 113 which produces a unidirectional voltage which varies in accordance with the frequency of circuit 60. The energization of field winding 113a may be varied by means of a resistance 113b to control the power produced by generator 89.

While the control circuit 96 has been shown and described as embodying a particular type of system for providing an electrical quantity which varies in accordance with the frequency of circuit 60 or the frequency at the transmitting end of the system, it is to be understood that I may employ any suitable arrangement known in the art. Furthermore, it is to be understood that I may employ any other suitable arrangement for controlling the power produced by generator 89 in accordance with the frequency of circuit 60.

I provide a circuit 114 which is responsive to an electrical condition of rectifier 59, such as the current absorbed thereby from circuit 60, to control the conductivities of the electronic converter including electric valves 6—23. The circuit 114 includes a plurality of inductive devices, such as current transformers 115, for producing a current which varies in accordance with the current absorbed by rectifier 59. If desired, a plurality of unidirectional conducting devices 116 may be employed to produce a unidirectional voltage or current which varies in accordance with the current absorbed by rectifier 59, or, in other words, in accordance with the voltage of circuit 60. Circuit 114 is connected to any suitable phase shifting arrangement, such as the rotary phase shifter 117, through conductors 118. The rotary phase shifter 117 may include relatively movable windings 119 and 120. The outer winding 119 may be associated with a rotatable core structure 121 which is moved by an actuating arm 122 and which may be spring biased. An actuating coil 123 is connected to be energized in accordance with the output voltage or current of circuit 114. The rotary phase shifter 117 is controlled to vary the conductivities of electric valves 6—23 in accordance with the voltage at the transmitting end of the system to cause these electric valves to absorb variable amounts of lagging quadrature current from the transmission line 3, thereby maintaining the voltage of the system at a predetermined value or within a predetermined range of values.

The operation of the embodiment of my invention shown in Figs. 4a and 4b will be explained by considering the system when electric power is being transmitted from an alternating current generator 89 to the load circuit 2 through the electronic converter and over the transmission line 3. By virtue of the operation of the electronic converter including electric valves 6—23, power is transmitted asynchronously between the generator 89 and circuit 2. The system will respond to transfer variable amounts of power to the load circuit 2 in accordance with the load requirements thereof and the control circuits and rectifier 59 operate to maintain the voltage at the transmitting end at a substantially constant value.

Considering the operation of the system when it is being controlled by the circuit 96 and the regulator 104, it is to be understood that power flow from the generator 89 to the load circuit 2 may be controlled by controlling the energization of the excitation circuit 91 of the generator 89. A certain field strength will correspond to full load and a limit may be set to the field excitation so that it cannot exceed this value. Another value of field excitation, somewhat smaller than the first, corresponds to no load conditions. The latter value of field excitation is that which produces a current through the electric valves 6—23 which is a local circulating current and which corresponds to the lagging quadrature current which must be consumed by the system at no load to hold the transmitting end voltage down to the predetermined range of values. Thus the power flow in the whole system may be regulated by change in field excitation of the alternator from the maximum or first mentioned value to the second or minimum value. If the generator excitation is reduced below this minimum value, the short-circuit current or the "spill-over" current will remain constant as determined by the voltage regulation of the system, and the lagging current will force its way through the frequency changer and through the generator armature windings. If the generator excitation is removed entirely, of if the generator is disconnected, the circuit of the spill-over current is closed through the frequency changer itself which then acts as a short-circuited rectifier.

A system of this nature may be put into operation in the following manner. Initially, the field excitation of the generator is reduced to a substantially zero value and the phase of the control voltage impressed on control members 26 of electric valves 6—23 is adjusted so that the voltage at the transmitting end of the transmission line is equal to the voltage at the receiving end. A spill-over current then flows through the electric valve circuit which then acts as a short-circuited rectifier. Field excitation may then be applied to the generator and gradually increased by adjusting resistance 113b. There is a range of field excitation over which increase of field excitation does not increase the spill-over current, but after a critical value of the generator excitation is attained, the spill-over current begins to increase causing a reduction in the voltage at the transmitting end. The control voltage impressed on the control members 26 of electric valves 6—23 may then be adjusted in phase by control of phase shifter 117 until the voltage reaches the normal value. Of course, during this change the voltages impressed on control members 26 are progressively retarded in phase relative to the applied anode-cathode voltage. Thus in progressive steps, the load of the system may be increased from no load to the full load value while maintaining the voltage of the transmission line substantially constant at all times.

Considering more particularly the operation of the circuit 114 and the rotary phase shifter 117 in controlling the conductivity of electric valves 6—23, it is to be noted that the voltage at the transmitting end of the system and hence the voltage of circuit 60 is controlled by causing the electric valves to absorb variable amounts of lagging quadrature current. For example, if the voltage of circuit 60 tends to rise above the predetermined value to be maintained, the rectifier 59 absorbs an increased amount of lagging quadrature current and this increased current is reflected through circuit 114 to the rotary phase shifter 117 which advances in phase the alternating voltages impressed on control members 26 of electric valves 6—23, causing these electric valves to absorb a larger amount of lagging quadrature current and thereby tending to restore the voltage to the desired value. Conversely, if the voltage tends to decrease below the desired value the phase of the alternating voltage impressed on control members 26 is retarded, causing the electric valves 6—23 to absorb a smaller amount of lagging quadrature current and thereby permitting the voltage of the system to rise to the desired value. It is to be understood that the amount of true power transmitted between generator 89 and the load circuit 2 may be controlled by controlling the excitation of the generator 89 or, in other words, by controlling the magnitude of the output voltage of the generator 89. Furthermore, it is to be noted that the amount of reactive power absorbed from the transmission line may be controlled by controlling the phase of the voltages impressed on control members 26 of electric valves 6—23.

Circuit 111 and circuit 96 automatically control the energization of field winding 91 of generator 89 to control the power generated thereby. For a particular adjustment of the energization of field winding 113a of the pilot generator 113, the system automatically responds to maintain the power generated at a substantially constant value. The rectifier 59 and circuit 114 operate to maintain the voltage at the transmitting end at a substantially constant value, and circuits 96 and 111 operate to maintain the power generated and transmitted at a substantially constant value.

It is important to note that power is transmitted between generator 89 and load circuit 2 asynchronously without reference to the angular displacement between the voltage vectors representing the voltage of circuit 2 and the voltage of generator 89. In other words, power may be transmitted from generator 89 to load circuit 2 even though the angular displacement between the voltage of generator 89 and the voltage of circuit 2 exceeds the theoretical 90 electrical degree limit of synchronous-to-synchronous electric power transmission. Furthermore, power may be transmitted in a stable manner from generator 89 to load circuit 2 even though the angular displacement between the sending end voltage and the receiving end voltage of transmission line 3 is greater than 90 electrical degrees. If it be assumed that the system is operating to transmit power from generator 89 to load circuit 2 and that a large increment of load is applied to circuit 2, the system nevertheless will maintain itself in operation irrespective of the angular displacement between the voltage of generator 89 and the voltage of circuit 2. Of course, during the transient condition which immediately follows an application of the increment of load, the voltage and the frequency of the system temporarily decrease until the throttle mechanism of a prime mover for the generator 89 is actuated to return the frequency of the system to the normal value. Of course, the circuit 111 operates during the same interval tending to return the voltage of generator 89 to the desired value.

Figure 5:
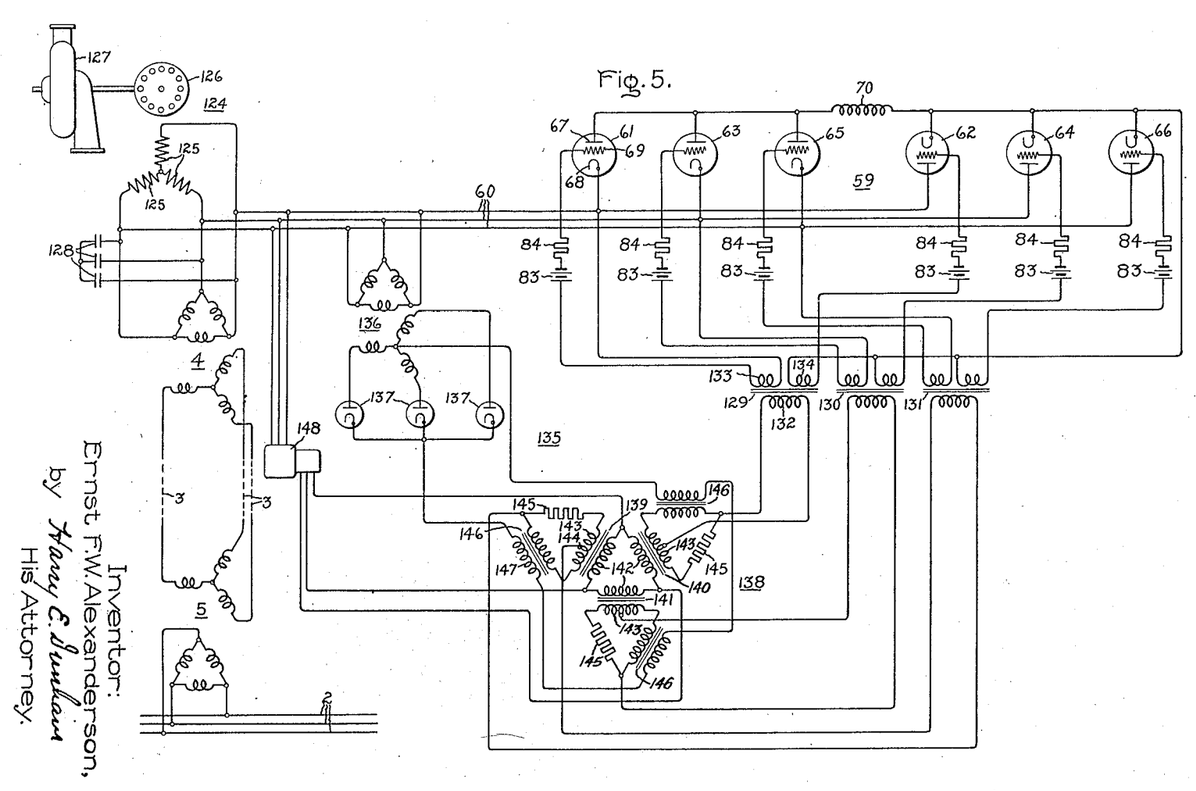
Fig. 5 diagrammatically illustrates a further embodiment of my invention as applied to an asynchronous electric power transmission system employing an induction generator.

In Fig. 5 of the accompanying drawings there is illustrated another embodiment of my invention as applied to an asynchronous electric power transmission system including an induction generator 124 which transmits power to the load circuit 2 over transmission line 3. The induction generator 124 includes inducing or armature windings 125 and an induced member 126 which may be of the squirrel cage type. The induction generator 124 may be driven by any suitable prime mover such as a turbine 127. Rectifier 59 is connected to the terminals of the induction generator 124 and is arranged to absorb variable amounts of lagging quadrature volt-amperes to control the voltage at the transmitting end of the system. Suitable means such as capacitances 128 may be connected to the terminals of the induction generator 124 to supply excitation current thereto.

The excitation circuits for electric valves 61—66 of the rectifier 59 impress on the control members 69 thereof alternating voltages which vary in phase and include transformers 129, 130 and 131, each having a primary winding 132 and secondary windings 133 and 134.

To control the conductivities of the electric valves 61—66 in accordance with the voltage of circuit 60 or in accordance with the voltage at the transmitting end of the system, I provide a voltage responsive circuit 135 which may include a transformer 136, a rectifier including unidirectional conducting devices such as electric valves 137, and an impedance phase shifting circuit 138. The impedance phase shifting circuit 138 may include transformers 139, 140 and 141, each of which includes a primary winding 142 and a secondary winding 143 provided with terminal connections and an electrically intermediate connection 144. Each of the individual impedance phase shifting circuits includes a resistance 145 and a variable inductance member, such as a saturable inductance 146, having a control winding 147 which is supplied with unidirectional current from circuit 60 through transformer 136 and the unidirectional conducting devices 137. The common juncture of the inductance 146 and resistance 145 and the associated electrically intermediate connection 144 are connected to primary windings 132 of transformers 129—131 to impress thereon alternating voltages which vary in phase in accordance with the variations in magnitude of the voltage of circuit 60. A suitable phase shifting circuit, such as a rotary phase shifter 148, may be interposed between transformers 139—141 to permit adjustment of the voltages impressed on control members 69 of electric valves 61—66.

The operation of the embodiment of my invention shown in Fig. 5 will be explained by considering the system when the induction generator 124 is transmitting power asynchronously to the load circuit 2 over the transmission line 3. Excitation current for the induction generator 124 will be supplied by the capacitances 128.

As is well known, when the receiving end of the transmission line is connected to a circuit of fixed voltage under no load or light load conditions, the voltage at the sending end tends to oscillate to an excessively large value due to the distributed inductance and capacitance of the line. In the arrangement shown, the capacitances 128 act in conjunction with the inductance of the transmission line to augment this condition. Under these conditions, the rectifier 59 absorbs lagging quadrature current which tends to maintain the voltage of the system within a predetermined range of values. For example, if the voltage tends to rise above the value to be maintained, a larger unidirectional current is transmitted to the control windings 147 effecting an advancement in phase of the control voltages impressed on control members 69 of electric valves 61—66 causing the rectifier 59 to absorb a larger amount of lagging reactive volt-amperes. This action restores the voltage to the predetermined value. Conversely, circuit 135 tends to decrease the amount of current consumed by the rectifier 59 when the voltage decreases below the predetermined value, thereby raising the voltage of the transmission line to the desired value.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In an alternating current asynchronous electric power transmission system including an alternating current transmission line, a load circuit connected to a receiving end of said line, asynchronous alternating current apparatus at a transmitting end of said line and comprising a source of alternating current and an electric valve circuit connected between said source and the transmitting end of said line, the method of operating the electric power transmission system by controlling the electric valve circuit to transmit power asynchronously between said source and said transmission line at a frequency substantially equal to the frequency of the source to permit changes in the relative angular velocities of the voltages of said transmission line and the voltage of said source.

2. In an alternating current asynchronous electric power transmission system, the combination of an electrically long alternating current transmission line having appreciable distributed inductance and capacitance tending to cause variations in the voltage at the transmitting end during changes in load conditions imposed thereon, a load circuit connected to a receiving end of said line, asynchronous alternating current apparatus connected to the transmitting end of said line and comprising a source of alternating current and an electric valve circuit connected between said source and said line for transmitting power asynchronously between said source and said load circuit over said transmission line, and means for controlling the magnitude of the voltage of said transmission line at the transmitting end.

3. In an alternating current asynchronous electric power system, the combination of an electrically long alternating current electric transmission line having appreciable distributed inductance and capacitance tending to cause variations in the voltage at the transmitting end during changes in load conditions imposed thereon, asynchronous electric power equipment connected to a transmitting end of said line, a load circuit connected to the receiving end of said line, and means comprising an electric valve rectifier connected to the transmitting end of the line for absorbing variable amounts of reactive volt-amperes to control the voltage of the transmission line.

4. In an alternating current asynchronous electric power system, the combination of an electrically long alternating current electric power transmission line having appreciable distributed inductance and capacitance tending to cause variations in the voltage at the transmitting end during changes in load conditions imposed thereon, asynchronous electric power apparatus connected to a transmitting end of said line, a load circuit connected to the receiving end of said line, a rectifier connected to the transmitting end of said line for absorbing variable amounts of reactive volt-amperes and comprising a plurality of electric valve means each having a control member for controlling the conductivity thereof, and a circuit responsive to the voltage at the transmitting end of said line for controlling the energization of said control members.

5. In an alternating current asynchronous electric power transmission system, the combination of an electrically long alternating current transmission line having appreciable distributed inductance and capacitance tending to cause variations in the voltage at the transmitting end during changes in load conditions imposed thereon, a receiving circuit connected to one end of said line, asynchronous alternating current apparatus connected to the other end of said transmission line and comprising a source of alternating current and an electric valve circuit connected between said source and said line for transmitting power therebetween, and a rectifier connected to the transmitting end of said transmission line for absorbing variable amounts of reactive volt-amperes to control the voltage of said transmission line.

6. In an alternating current asynchronous electric power transmission system, the combination of an electrically long alternating current transmission line having appreciable distributed inductance and capacitance tending to cause variations in the voltage at the transmitting end during changes in load conditions imposed thereon, a load circuit connected to a receiving end of said line, asynchronous alternating current apparatus at the transmitting end of said line and comprising a source of alternating current and an electric valve circuit connected between said source and the transmitting end of said line to transmit power asynchronously between said source and said load circuit, and means for controlling the amount of power transmitted between said source and said load circuit.

7. In combination, an electrically long alternating current transmission line having appreciable distributed inductance and capacitance tending to cause variations in the voltage at the transmitting end during changes in load conditions imposed thereon, a load circuit connected to a receiving end of said line, asynchronous alternating current apparatus at the transmitting end of said line and comprising a source of alternating current and an electric valve circuit having an input circuit connected to said source and having an output circuit connected to the transmitting end of said line to transmit power asynchronously between said source and said load circuit over said transmission line, voltage controlling means connected to the output circuit of said electric valve circuit, and means for controlling the amount of power transmitted between said source and said load circuit.

8. In combination, an electrically long alternating current transmission line having appreciable distributed inductance and capacitance tending to cause variations in the voltage at the transmitting end during changes in load conitions imposed thereon, a load circuit connected to a receiving end of said line, asynchronous alternating current apparatus at the transmitting end of said line and comprising a source of alternating current and an electric valve circuit having an input circuit connected to said source and having an output circuit connected to the transmitting end of said line to transmit power asynchronously between said source and said load circuit over said transmission line, voltage controlling means comprising a controlled rectifier connected to the output circuit of said electric valve circuit for absorbing variable amounts of reactive volt-amperes, and means for controlling the amount of power transmitted between said source and said load circuit.

9. In combination, an alternating current transmission line, a load circuit connected to a receiving end of said line, asynchronous alternating current apparatus at the transmitting end of said line and comprising an alternating current generator and a electric valve circuit connected between said generator and the transmitting end of said line to permit the asynchronous transmission of power between said generator and said load circuit over said transmission line, means for controlling the magnitude of the voltage of said transmission line at the transmitting end, and means for controlling said generator to control the amount of power transmitted between said generator and said load circuit.

10. In combination, an alternating current electric power transmission line, a load circuit connected to a receiving end of said line, asynchronous alternating current apparatus at a transmitting end of said line and comprising a source of alternating current and an electric valve means connected between said source and the transmitting end of said line to transmit power asynchronously between said source and said load circuit, said electric valve means having control means for controlling the conductivity thereof, and means for controlling the energization of said control means in accordance with the voltage of said transmission line at the transmitting end to control the amount of power transmitted between said source and said load circuit.

11. In combination, an alternating current electric power transmission line, a load circuit connected to a receiving end of said line, asynchronous alternating current apparatus at a transmitting end of said line and comprising a source of alternating current and an electric valve means connected between said source and the transmitting end of said line to transmit power asynchronously between said source and said load circuit, said electric valve means having control means for controlling the conductivity thereof, and means for controlling the energization of said control means and for controlling the magnitude of the voltage of said source to control the amount of power transmitted between said source and said load circuit.

12. In combination, an alternating current electric power transmission line, a load circuit connected to a receiving end of said line, asynchronous alternating current apparatus at a transmitting end of said line and comprising a source of alternating current and an electric valve means connected between said source and the transmitting end of said line to transmit power asynchronously between said source and said load circuit, said electric valve means having control means for controlling the conductivity thereof, means for controlling the magnitude of the voltage of said source to control the amount of the true power transmitted between said source and said load circuit, and means for controlling the energization of said control means to control the amount of reactive power transmitted between said source and said load circuit.

13. In combination, an alternating current supply circuit, an alternating current load circuit, electric translating apparatus connected therebetween and comprising a plurality of electric valves arranged to conduct current in a predetermined order and each having a control member for controlling the conductivity thereof, an excitation system for impressing on the control members periodic voltages, a controlled rectifier connected to said load circuit for absorbing variable amounts of lagging reactive volt-amperes in accordance with the voltage of said load circuit, and means responsive to an electrical condition of said rectifier for controlling the phase of said periodic voltages to control the voltage of said load circuit.

14. In an alternating current asynchronous electric power transmission system, the combination of a transmission line, a load circuit connected to a receiving end of said transmission line, asynchronous alternating current apparatus at a transmitting end of said line and comprising a source of alternating current and an electric valve circuit connected between said source and the transmitting end of said line to transmit power asynchronously between said source and said load circuit over said transmission line, said electric valve circuit having a plurality of electric valve means arranged to conduit current in a predetermined order and each comprising a control means for controlling the conductivity thereof, an excitation system for impressing on said control means periodic voltages, and means for controlling the phase of the periodic voltages to cause said electric valve circuit to absorb variable amounts of lagging reactive volt-amperes to control the voltage of said transmission line.

15. In combination, an alternating current transmission line, an alternating current generator of the synchronous type having armature and excitation circuits, a load circuit connected to a receiving end of said transmission line, an electric valve circuit connected between the armature circuit and a transmitting end of said line for transmitting electric power asynchronously between said generator and said load circuit at a frequency substantially equal to the frequency of said generator, and means for controlling the energization of the excitation circuit of said generator to control the amount of power transmitted from said generator to said load circuit.

16. In combination, an alternating current transmission line, an alternating current generator of the synchronous type having armature and excitation circuits, a load circuit connected to a receiving end of said transmission line, an electric valve circuit connected between the armature circuit and a transmitting end of said line for transmitting electric power asynchronously between said generator and said load circuit, and means for controlling the energization of the excitation circuit.

17. In an electric power transmission system, a source of alternating current, a load circuit, an electrically long alternating current transmission circuit interconnecting said source and said load circuit, said transmission circuit being of sufficient length to have appreciable distributed inductance and capacitance to cause thereby a substantial variation in voltage at the input end of the circuit under varying load conditions imposed thereon, electronic means interposed between said source and the input end of said transmission circuit for transmitting alternating current asynchronously between said source and said transmission circuit at a frequency substantially equal to the frequency of said source, and means responsive to the voltage at the input end of said transmission circuit for controlling said electronic means to control the voltage and power factor at the input end of said transmission circuit.

18. In an electric power transmission system, a source of alternating current, a load circuit, an alternating current transmission circuit interconnecting said source and said load circuit, electronic means interposed between said source and the input end of said transmission circuit for transmitting alternating current between said source and said transmission circuit, means for controlling said electronic means in accordance with the voltage on the output side of said electronic means, and means responsive to the voltage of said transmission circuit for maintaining said transmission circuit voltage within a predetermined range of values.

19. In an alternating current asynchronous electric power transmission system, the combination of a transmission line, a load circuit connected to a receiving end of said line, asynchronous alternating current apparatus connected to a transmitting end of said transmission line and comprising a source of alternating current and an electric valve circuit connected between said source and the transmitting end of said line to transmit power asynchronously between said source and said load circuit, a rectifying circuit connected to the transmitting end of said transmission line and comprising a plurality of electric valve means each having a control member for controlling the conductivity thereof, an excitation circuit for impressing periodic voltages on the control members, and means for controlling the phase of said periodic voltages relative to the voltage of said transmission line at the transmitting end to control the amount of lagging volt-amperes absorbed by said rectifying circuit.

20. In combination, an alternating current transmission line, an alternating current generator of the synchronous type having armature and excitation circuits, a load circuit connected to a receiving end of said transmission line, an electric valve circuit connected between the armature circuit and a transmitting end of said transmission line and comprising a plurality of electric valve means arranged to conduct current in a predetermined order and each comprising a control member for controlling the conductivity thereof, a control circuit for impressing on the control members periodic voltages, a rectifier connected to the transmitting end of said line and comprising a plurality of electric valve means each having a control member for controlling the conductivity thereof, means for energizing the last mentioned control members, and means responsive to the current absorbed by said rectifier from said transmission line for controlling the phase of the periodic voltages impressed on the first mentioned control members, and means responsive to the voltage at the transmitting end of said line for controlling the energization of said excitation circuit.

21. In combination, an alternating current circuit, a second circuit, an inductive device having a primary winding and a secondary winding, said secondary winding being connected to said second circuit, a resistance connected in series relation with said primary winding, and a capacitance connected effectively in parallel with said primary winding, said capacitance and the inductance of said primary winding constituting a tuned resonant electric circuit responsive to the magnitude of the voltage of said first mentioned circuit to control the phase of the voltage induced in said secondary winding relative to the voltage of said first mentioned circuit.

22. In combination, an alternating current circuit, a second circuit, an inductive device of the saturable type having a primary winding and a secondary winding for producing an alternating voltage of peaked wave form, said secondary winding being connected to said second circuit, and a circuit responsive to the voltage of said first mentioned circuit comprising a resistance connected in series relation with said primary winding and a capacitance effectively connected in parallel with said primary winding, said capacitance and the inductance of said primary winding constituting a tuned resonant electric circuit responsive to the magnitude of the voltage of said first mentioned circuit to control the phase of said alternating voltage of peaked wave form relative to the voltage of said first mentioned circuit.

23. In combination, an alternating current circuit, an electric valve means connected to said circuit and having a control member for controlling the conductivity thereof, an inductive device having a primary winding and a secondary winding, said secondary winding being connected to said control member for impressing a periodic voltage thereon, and a circuit connected between said alternating current circuit and said primary winding for controlling the phase of the voltage impressed thereon in accordance with the voltage of said alternating current circuit and comprising a capacitance connected effectively in parallel relation with said primary winding and a resistance connected in series relation with said capacitance and said primary winding, said capacitance and the inductance of said primary winding constituting a tuned resonant circuit responsive to the magnitude of the voltage of said alternating current circuit.

24. In combination, an alternating current circuit, an electric valve means connected to said circuit and having a control member for controlling the conductivity thereof, a transformer of the saturable type having a primary winding and a secondary winding, said secondary winding being connected to said control member for impressing thereon a periodic voltage of peaked wave form, and a and a circuit connected between said alternating current circuit and said primary winding for controlling the phase of the voltage impressed thereon in accordance with the voltage of said alternating current circuit and comprising a capacitance connected effectively in parallel relation with said primary winding and a resistance connected in series relation with said capacitance and said primary winding, said capacitance and the inductance of said primary winding constituting a tuned circuit and arranged so that the voltage impressed on said primary winding leads the voltage of said alternating current circuit for voltages of said alternating current circuit above a predetermined value and lags the voltage of said alternating current circuit for voltages of said alternating current circuit below said predetermined value.

25. In an alternating current asynchronous electric power transmission system, the combination of a transmission line, a load circuit connected to a receiving end of said line, an induction generator connected to a transmitting end of said line, means comprising capacitances connected to the transmitting end of said line for supplying exciting current to said induction generator, and an electric valve rectifier connected to the transmitting end of said line for absorbing variable amounts of lagging reactive volt-amperes to control the voltage of said circuit.

26. In an alternating current asynchronous electric power transmission system, the combination of a transmission line, a load circuit connected to a receiving end of said line, an induction generator connected to a transmitting end of said line, means comprising capacitances connected to the transmitting end of said line for supplying exciting current to said induction generator, a rectifier connected to the transmitting end of said line and including a plurality of electric valve means each having a control member for controlling the conductivity thereof, and an excitation circuit for energizing the control members so that said rectifier absorbs variable amounts of lagging quadrature current to control the voltage at the transmitting end of said line.

27. In combination, an alternating current transmission line, an alternating current generator of the synchronous type having armature and excitation circuits, a load circuit connected to a receiving end of said transmission line, means for transmitting power over said transmission line independently of the angular displacement between the transmitting end and receiving end voltages thereof and comprising an electric valve circuit connected between said generator and the transmitting end of said line for transmitting electric power asynchronously between said generator and said load circuit at a frequency substantially equal to the frequency of said generator, and means for controlling the energization of said excitation circuit.

28. In an electric power transmission system, a source of alternating current of substantially constant frequency, a load circuit, an electrically long alternating current transmission circuit interconnecting said source and said load circuit, said transmission circuit being of sufficient length to have appreciable distributed inductance and capacitance to cause thereby substantial variations in voltage at the input end of said transmission circuit under varying load conditions imposed thereon, electronic means interposed between said source and the input end of said transmission circuit for transmitting asynchronously alternating current between said source and said transmission circuit, and means for controlling said electronic means in accordance with the voltage of said alternating current transmission circuit.

ERNST F. W. ALEXANDERSON.

CERTIFICATE OF CORRECTION.

Patent No. 2,207,570.  July 9, 1940.

ERNST F. W. ALEXANDERSON.

It is hereby certified that error appears in the printed specification of the above numbered patent requiring correction as follows: Page 1, first column, line 30, for "reseiving" read --receiving--; and second column, line 32, for "transmision" read --transmission--; page 4, second column, line 48, for "therey" read --thereby--; page 7, second column, line 29, claim 2, for "aparatus" read --apparatus--; page 8, second column, line 2, claim 9, for "a" before "electric" read --an--; page 9, first column, line 17, claim 14, for "conduit" read --conduct--; page 10, first column, line 43, claim 24, strike out "and a" second occurrence; and that the said Letters Patent should be read with this correction therein that the same may conform to the record of the case in the Patent Office.

Signed and sealed this 27th day of August, A. D. 1940.

(Seal)

Henry Van Arsdale,
Acting Commissioner of Patents.